(12) United States Patent
Aizawa

(10) Patent No.: US 11,529,847 B2
(45) Date of Patent: Dec. 20, 2022

(54) VEHICULAR AIR-CONDITIONING DEVICE

(71) Applicant: DENSO CORPORATION, Kariya (JP)

(72) Inventor: Hideo Aizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 38 days.

(21) Appl. No.: 16/278,758

(22) Filed: Feb. 19, 2019

(65) Prior Publication Data

US 2019/0184789 A1 Jun. 20, 2019

Related U.S. Application Data

(63) Continuation of application No. PCT/JP2017/028664, filed on Aug. 8, 2017.

(30) Foreign Application Priority Data

Sep. 7, 2016 (JP) .............................. JP2016-174240

(51) Int. Cl.
*B60H 1/00* (2006.01)
*B60H 1/32* (2006.01)

(52) U.S. Cl.
CPC ........... *B60H 1/00878* (2013.01); *B60H 1/00* (2013.01); *B60H 1/00064* (2013.01);
(Continued)

(58) Field of Classification Search
CPC ........ B60H 1/00878; B60H 1/32; B60H 1/00; B60H 1/00064; B60H 1/00964; B60H 1/3205; B60H 1/3227
(Continued)

(56) References Cited

U.S. PATENT DOCUMENTS 4,456,055 A * 6/1984 Yoshimi ............. B60H 1/00814
165/243
4,484,619 A * 11/1984 Franz ................... B60H 1/3205
165/254

(Continued)

FOREIGN PATENT DOCUMENTS

JP    2007093138 A    4/2007
JP    2010018227 A    1/2010

(Continued)

*Primary Examiner* — Eric S Ruppert
*Assistant Examiner* — Kirstin U Oswald
(74) *Attorney, Agent, or Firm* — Harness, Dickey & Pierce, P.L.C.

(57) ABSTRACT

A vehicular air-conditioning device includes an inside air temperature detector, an inside air-conditioning portion, and an air-conditioning controller. The inside air-conditioning portion includes a temperature adjuster and a blower. The air-conditioning controller includes an auto control portion, an open signal detector, a thermal load determiner, and a power saving control portion. The auto control portion is configured to perform an auto control. The open signal detector is configured to detect an open signal. The thermal load determiner is configured to determine whether a thermal load on the passenger compartment exceeds an air-conditioning capacity of the auto control. The power saving control portion is configured to perform a power saving control to limit an increase of a power consumption regardless of the inside air temperature when the open signal is detected and it is determined that the thermal load exceeds the air-conditioning capacity of the auto control.

9 Claims, 6 Drawing Sheets

(52) U.S. Cl.
CPC ........... *B60H 1/00964* (2013.01); *B60H 1/32* (2013.01); *B60H 1/3205* (2013.01); *B60H 1/3227* (2013.01)

(58) Field of Classification Search
USPC .......................................................... 62/239
See application file for complete search history.

(56) References Cited

U.S. PATENT DOCUMENTS

| | | | | |
|---|---|---|---|---|
| 4,928,499 | A * | 5/1990 | Kiminami | F25B 49/022 454/75 |
| 5,555,737 | A * | 9/1996 | Takeo | B60H 1/3205 62/236 |
| 6,430,951 | B1 * | 8/2002 | Iritani | B60H 1/00814 62/90 |
| 6,719,624 | B2 * | 4/2004 | Hayashi | B60H 1/00285 62/239 |
| 2003/0211820 | A1 * | 11/2003 | Tsuji | B60H 1/00785 454/93 |
| 2004/0065100 | A1 * | 4/2004 | Jacobsen | B60H 1/3232 62/196.4 |
| 2004/0089006 | A1 * | 5/2004 | Kamiya | B60H 1/3407 62/244 |
| 2005/0194125 | A1 * | 9/2005 | Asai | B60H 1/00792 165/202 |
| 2009/0187286 | A1 * | 7/2009 | Magalhaes Medeiros Neto | F25B 49/02 62/157 |
| 2010/0187211 | A1 * | 7/2010 | Eisenhour | B60H 1/2225 219/202 |
| 2013/0084790 | A1 * | 4/2013 | Furuse | B60H 1/32 454/75 |
| 2013/0324024 | A1 * | 12/2013 | Remmers | B60H 1/00964 454/75 |
| 2013/0332013 | A1 * | 12/2013 | Malone | B60K 6/48 701/22 |
| 2014/0027090 | A1 * | 1/2014 | Morikawa | B60H 1/00842 165/47 |
| 2014/0110489 | A1 * | 4/2014 | Yasui | B60N 2/5685 237/5 |
| 2016/0059665 | A1 * | 3/2016 | Kim | B60H 1/00971 165/11.1 |
| 2016/0288621 | A1 | 10/2016 | Sakane | |

FOREIGN PATENT DOCUMENTS

| | | | |
|---|---|---|---|
| JP | 2010030452 A | * | 2/2010 |
| JP | 2011068156 A | | 4/2011 |
| JP | 2013095347 A | | 5/2013 |
| JP | 2014113962 A | | 6/2014 |
| JP | 2015120500 A | | 7/2015 |
| JP | 2016060429 A | | 4/2016 |

* cited by examiner

FIG. 3

|  | REFRIGERANT VOLUME DISCHARGED FROM COMPRESSOR | AIR VOLUME BLOWN BY BLOWER | TARGET OPENING DEGREE OF AIR MIX DOOR | ... |
|---|---|---|---|---|
| AUTOMATIC CONTROL | DEPENDING ON TARGET BLOWN AIR TEMPERATURE | DEPENDING ON TARGET BLOWN AIR TEMPERATURE | DEPENDING ON TARGET BLOWN AIR TEMPERATURE | ... |
| POWER SAVING CONTROL | PARAMETER X | PARAMETER Y | PARAMETER Z | ... |

FIG. 6

| | REFRIGERANT VOLUME DISCHARGED FROM COMPRESSOR | AIR VOLUME BLOWN BY BLOWER | TARGET OPENING DEGREE OF AIR MIX DOOR | ... |
|---|---|---|---|---|
| AUTOMATIC CONTROL | DEPENDING ON TARGET BLOWN AIR TEMPERATURE | DEPENDING ON TARGET BLOWN AIR TEMPERATURE | DEPENDING ON TARGET BLOWN AIR TEMPERATURE | ... |
| POWER SAVING CONTROL | DISCHARGED VOLUME WHEN OPENING SIGNAL DETECTED | BLOWN AIR VOLUME WHEN OPENING SIGNAL DETECTED | TARGET OPENING DEGREE WHEN OPENING SIGNAL DETECTED | ... |

VEHICULAR AIR-CONDITIONING DEVICE

CROSS REFERENCE TO RELATED APPLICATIONS

The present application is a continuation application of International Patent Application No. PCT/JP2017/028664 filed on Aug. 8, 2017, which designated the United States and claims the benefit of priority from Japanese Patent Application No. 2016-174240 filed on Sep. 7, 2016. The entire disclosures of all of the above applications are incorporated herein by reference.

TECHNICAL FIELD

The present disclosure relates to a vehicular air-conditioning device controlling air-conditioning of a passenger compartment based on temperature of the passenger compartment.

BACKGROUND

A vehicular air-conditioning device is generally provided in a vehicle for enhancing comfort of an occupant in a passenger compartment of the vehicle. The vehicular air-conditioning device may automatically control air-conditioning such as cooling and heating based on an inside air temperature of the passenger compartment.

The passenger compartment has openings such as windows, doors, and sunroof. The windows and the like may be opened for ventilation, for example, even when the air-conditioning of the passenger compartment is being performed by the vehicular air-conditioning device.

SUMMARY

A vehicular air-conditioning device according to an aspect of the present disclosure is used in a vehicle having an opening portion through which an inside and an outside of a passenger compartment communicate with each other, the opening portion being configured to open and close. The vehicular air-conditioning device includes an inside air temperature detector, an inside air-conditioning portion configured to perform an air-conditioning of the passenger compartment, and an air-conditioning controller. The inside air temperature detector is configured to detect an inside air temperature in the passenger compartment. The inside air-conditioning portion includes a temperature adjuster configured to adjust a temperature of air in the passenger compartment, and a blower configured to send the air to the passenger compartment. The air-conditioning controller includes an auto control portion, an open signal detector, a thermal load determiner, and a power saving control portion. The auto control portion is configured to perform an auto control to automatically change an operation of the inside air-conditioning portion based on the inside air temperature detected by the inside air temperature detector. The open signal detector is configured to detect an open signal indicating that the opening portion is open. The thermal load determiner is configured to determine whether a change of the thermal load on the passenger compartment exceeds an air-conditioning capacity of the auto control. The power saving control portion is configured to perform a power saving control to limit an increase of a power consumption of at least one of the temperature adjuster or the blower of the inside air-conditioning portion regardless of the inside air temperature when the open signal is detected and it is determined that the change of the thermal load on the passenger compartment exceeds the air-conditioning capacity of the auto control.

BRIEF DESCRIPTION OF THE DRAWINGS

FIG. 3 is an explanatory diagram relating to contents of auto control and power saving control according to the first embodiment.

FIG. 6 is an explanatory diagram relating to contents of automatic control and power saving control according to the second embodiment.

EMBODIMENTS

Figure 1:
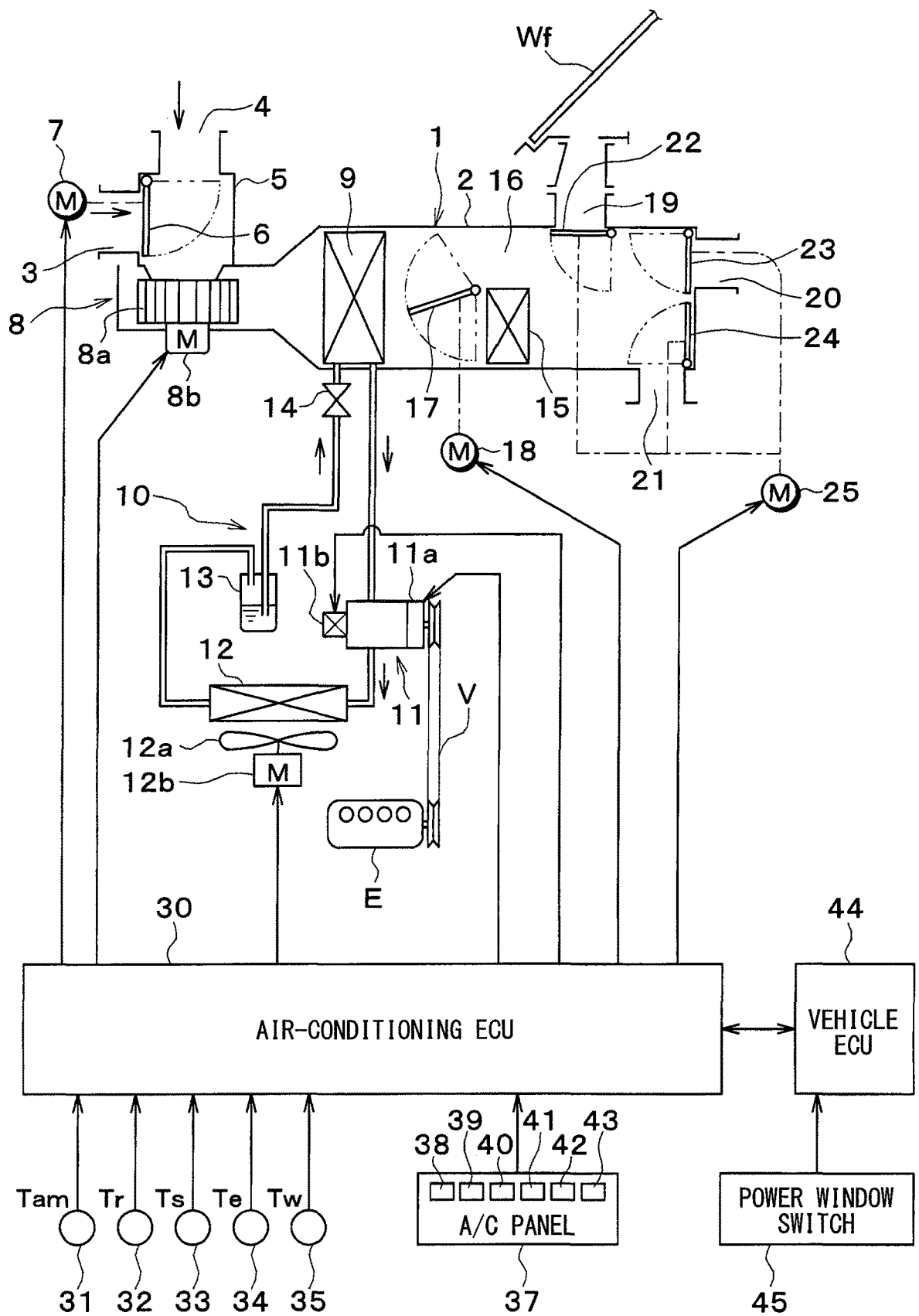
FIG. 1 is a diagram illustrating an overall configuration of a vehicular air-conditioning device according to a first embodiment of the present disclosure.

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

First Embodiment

An embodiment (first embodiment) will be described with reference to the drawings, in which a vehicular air-conditioning device of the present disclosure is used as a vehicular air-conditioning device for adjusting temperature of the passenger compartment to be appropriate. FIG. 1 shows an overview of the overall configuration of the vehicular air-conditioning device according to the first embodiment.

The vehicular air-conditioning device according to the first embodiment is mounted on a vehicle driven by a vehicular engine E and adjusts temperature of the passenger compartment to be appropriate. The vehicle in the first embodiment includes a window (hereinafter, referred to as power window) that can be opened and closed by using electricity or air on doors defining both sides of the passenger compartment. The power window can be freely opened and closed by operation of a power window switch 45 described later. That is, the power window is an example of an opening portion.

As illustrated in FIG. 1, the vehicular air-conditioning device includes an inside air-conditioning unit 1, a refrigeration cycle device 10, and an air-conditioning controller 30. The air-conditioning controller 30 may be an example of an air-conditioning control unit.

The indoor air-conditioning unit 1 is disposed inside an instrument panel at the foremost part of the inside of the vehicle compartment.

The inside air-conditioning unit 1 accommodates, in a casing 2 that is an outer shell of the air-conditioning unit 1, an inside-outside air switching case 5, an inside air blower 8, a heater core 15, a bypass passage 16, and an air mix door 17, for example. The inside air-conditioning unit 1 may be an example of an air blowing portion that blows air into the passenger compartment.

The casing 2 defines an air passage through which air blown into the passenger compartment flows. The casing 2 is formed of a resin having a certain degree of elasticity and an excellent strength (e.g., polypropylene).

The inside-outside air switching case 5 is located in the most upstream part of the air passage of the casing 2. The inside-outside air switching case 5 includes an inside air intake port 3 communicating with the passenger compartment, an outside air intake port 4 communicating with an outside of the passenger compartment, an inside-outside air switching door 6, and a servomotor 7.

The inside-outside air switching door 6 is rotatably provided inside the inside-outside air switching case 5 and driven by the servomotor 7. The inside-outside air switching case 5 controls an driving operation of the inside-outside air switching door 6 and switches between an inside air mode for taking in the inside air (air inside the passenger compartment) from the inside air intake port 3, an outside air mode for taking in the outside air (air outside the passenger compartment) from the outside air intake port 4, and a half-inside-air mode for taking in both the inside air and the outside air.

An electric inside blower 8 is located downstream of the inside-outside air switching case 5. The inside blower 8 is configured to blow air toward the passenger compartment by driving a centrifugal multi-blade fan 8*a* by a motor 8*b*.

An evaporator 9 constituting the refrigeration cycle device 10 is located downstream of the inside blower 8. Since a low-pressure refrigerant flowing into the evaporator 9 absorbs heat from the blown air from the inside blower 8 and is evaporated, the evaporator 9 cools the blown air from the inside blower 8.

The refrigeration cycle device 10 is a vapor compression refrigerator and includes a compressor 11, a condenser 12, a gas-liquid separator 13, and an expansion valve 14 in addition to the evaporator 9. In the refrigeration cycle device 10, a fluorocarbon refrigerant is used as the refrigerant. That is, the refrigeration cycle device 10 is a subcritical refrigeration circuit in which the pressure of the high-pressure refrigerant does not exceed the critical pressure of the refrigerant. The refrigeration cycle device 10 may be an example of a temperature adjuster adjusting a temperature of the air inside the passenger compartment. A unit including the refrigeration cycle device 10 and the inside air-conditioning unit 1 may be an example of an inside air conditioner performing air-conditioning of the passenger compartment.

The compressor 11 draws, compresses, and discharges the refrigerant of the refrigeration cycle device 10. The compressor 11 is driven by a rotational power of a vehicular engine E transmitted through an electromagnetic clutch 11*a*, a pulley and a belt V. The compressor 11 is a variable capacity type compressor capable of continuously and variably controlling the discharge capacity based on an external control signal.

Specifically, the compressor 11 includes an electromagnetic capacity control valve 11*b* whose opening degree is changed based on the control current output from the air-conditioning controller 30. The stroke of the piston of the compressor 11 is changed by adjusting the opening degree of the electromagnetic capacity control valve 11*b* by controlling the control pressure in the compressor 11. According to this, the discharge capacity of the compressor 11 can be changed continuously between almost 0% and 100%.

The condenser 12 condenses the refrigerant from the compressor 11 by exchanging heat with the air outside the passenger compartment (i.e. outside air) blown from a cooling fan 12*a* that is an outside bower. The condenser 12 serves as a so-called condenser.

The cooling fan 12*a* is an electric blower whose operation rate (i.e. rotational speed) is controlled by a control voltage input to a motor 12*b* from the air conditioning control device 30. That is, the air volume blown by the cooling fan 12*a* can be appropriately controlled by the air-conditioning controller 30.

The gas-liquid separator 13 is a receiver that separates the refrigerant condensed by the condenser 12 into gas refrigerant and liquid refrigerant, stores excess refrigerant, and allows the liquid refrigerant to flow to the downstream side.

The expansion valve 14 is a decompressor that decompresses and evaporates the liquid-phase refrigerant separated in the gas-liquid separator 13. The expansion valve 14 includes a valve body and an electric actuator to have an electric variable throttle mechanism. The valve body is configured to change the passage opening degree (i.e. throttle opening degree) of the refrigerant passage. The electric actuator includes a stepper motor configured to change the throttle opening degree of the valve body.

The operation of the expansion valve 14 is controlled by a control signal output from the air-conditioning controller 30. That is, the expansion valve 14 is configured to control the throttle opening degree based on the control signal from the air-conditioning controller 30 such that the refrigerant is decompressed in a isenthalpic process and a superheat degree of the refrigerant drawn to the compressor 11 becomes a predetermined value.

In the refrigeration cycle device 10, the refrigerant decompressed and expanded by the expansion valve 14 flows into the evaporator 9 and subsequently flows into the compressor 11 again. In the refrigeration cycle, the refrigerant flows through, in order, the compressor 11, the condenser 12, the gas-liquid separator 13, the expansion valve 14, the evaporator 9, and the compressor 11. The components of the refrigeration cycle (evaporator 9, compressor 11, condenser 12, gas-liquid separator 13, and expansion valve 14) are connected with each other through refrigeration pipes.

As shown in FIG. 1, a heater core 15 is located downstream of the evaporator 9 in the inside air-conditioning unit 1. The heater core 15 heats the air (cool air) having passed through the evaporator 9 by using, as heat source, cooling water of the vehicular engine E circulating in the engine cooling water circuit that is not shown.

The bypass passage 16 is defined next to the heater core 15. Through the bypass passage 16, the air passing through the evaporator 9 bypasses the heater core 15 and flows to the downstream side of the heater core 15.

The air mix door 17 is provided rotatably and located downstream of the evaporator 9 and upstream of the heater core 15 and the bypass passage 16 with respect to the air flow. The air mix door 17 is driven by a servomotor 18. In the vehicular air-conditioning device, the air-conditioning controller 30 is configured to control an operation of the servomotor 18 to continuously adjust a rotational position (opening degree) of the air mix door 17.

In the vehicular air-conditioning device, a proportion of a volume of air (volume of warm air) flowing through the heater core 15 to a volume of air (volume of cool air) flowing through the bypass passage 16 to bypass the heater core 15 can be adjusted by the opening degree of the air mix door 17. That is, the vehicular air-conditioning device is configured to adjust the temperature of the air blowing into the passenger compartment.

Further, a defroster air outlet 19, a face air outlet 20, and a foot air outlet 21 are located in the most downstream portion of the casing 2 with respect to the blown air flow. The air outlets are provided to allow conditioned air adjusted by the air mix door 17 to flow into the passenger compartment that is the air conditioning target space.

Specifically, the defroster air outlet 19 is an air outlet allowing the conditioned air to flow toward a windshield Wf located on the front side of the vehicle. The face air outlet 20 is an air outlet allowing the conditioned air to flow toward an upper body of an occupant in the passenger compartment. The foot air outlet 21 is an air outlet allowing the conditioned air to flow toward feet of the occupant.

A defroster door 22, a face door 23, and a foot door 24 are rotatably provided on upstream sides of the defroster air outlet 19, the face air outlet 20, and the foot air outlet 21, respectively.

That is, the defroster door 22 is configured to adjust an opening area of the defroster air outlet 19, and the face door 23 is configured to adjust an opening area of the face air outlet 20. The foot door 24 is configured to adjust an opening area of the foot air outlet 21.

The defroster door 22, the face door 23, and the foot door 24 are connected to a common servomotor 25 through link mechanisms, for example. The operation of the servomotor 25 is controlled by a control signal output from the air-conditioning controller 30. According to the vehicular air-conditioning device, a blowing port mode can be switched by controlling the operation of the servomotor 25 using the air-conditioning controller 30.

Next, a control system of the vehicular air-conditioning device according to the first embodiment will be described. The air-conditioning controller 30 is a control portion that controls operations of various control target devices constituting the inside air-conditioning unit 1. The air-conditioning controller 30 is configured by a well-known microcomputer including a CPU, a ROM, a RAM, and the like, as well as a peripheral circuit of the microcomputer. The air-conditioning controller 30 of the first embodiment stores a control program shown in FIG. 2 in its ROM and performs calculations and processing based on the control program.

A sensor group for air-conditioning is connected to an input side of the air-conditioning controller 30. Accordingly, the air-conditioning controller 30 is configured to perform various detection based on sensor detected signals output from the sensor group for air-conditioning. The sensor group for air-conditioning includes an outside air sensor 31, an inside air sensor 32, a solar irradiance sensor 33, an evaporator temperature sensor 34, and a water temperature sensor 35, for example.

The outside air sensor 31 detects an outside air temperature Tam that is a temperature of air outside the vehicle. The inside air sensor 32 detects an inside air temperature Tr that is a temperature of air inside the passenger compartment. The solar irradiance sensor 33 detects solar irradiation Ts in the passenger compartment. The evaporator temperature sensor 34 detects a temperature of the evaporator 9 itself. The evaporator temperature sensor 34 is attached to a fin or a tank constituting the evaporator 9. The water temperature sensor 35 detects a temperature Tw of an engine cooling water flowing into the heater core 15. The outside air sensor 31 may be an example of an outside air temperature detector that detects the temperature of air outside the vehicle. The inside air sensor 32 may be an example of an inside air temperature detector that detects the temperature of air inside the passenger compartment.

An operation panel 37 is connected to an input side of the air-conditioning controller 30. The operation panel 37 is located in the vicinity of the instrument panel in the front part of the passenger compartment and includes various operation switches. Accordingly, the air-conditioning controller 30 is configured to detect operation to the operation panel 37 based on operation signals output from the operation switches of the operation panel 37.

The various operation switches of the operation panel 37 includes a blowing mode switch 38, an inside-outside air switching switch 39, an air-conditioning switch 40, an air blowing switch 41, an auto switch 42, and a temperature setting switch 43.

The blowing mode switch 38 is operated to manually set a blowing mode that is switched by the blowing mode doors (i.e. defroster door 22, face door 23, foot door 24). The inside-outside air switching switch 39 is operated to manually set an inside-outside air intake mode of the inside-outside air switching case 5.

The air-conditioning switch 40 is operated to switch between operation and stop of cooling or dehumidification of passenger compartment by the inside air-conditioning unit 1. The air blowing switch 41 is operated to manually set the volume of the air blown by the inside blower 8. The auto switch 42 is operated to turn on and off an automatic control of the air-conditioning.

As described above, the vehicle of the first embodiment includes the power windows in the doors on both sides of the vehicle, and the power windows function as opening portions. The power window is opened and closed using a motor (not shown) by a power source.

A power window switch 45 is connected to the input side of a vehicle controller 44, and an operation signal of the power window switch 45 is input to the vehicle controller 44. The power window switch 45 is located on a window open-close operation panel provided on a front door on the driver's side defining a side of the passenger compartment.

Accordingly, the vehicular controller 44 is configured to control an actuation of the motor based on the operation signal input from the power window switch 45 to selectively open and close the power window. The power window switch 45 outputs an open signal indicating an open (ON) state upon the power window being opened. The power window switch 45 outputs a close signal indicating a close (OFF) state upon the power window being closed.

As shown in FIG. 1, the power window switch 45 is connected to the input side of the air-conditioning controller 30 through the vehicle controller 44. Accordingly, the open signal and the close signal output from the power window switch 45 is input to the air-conditioning controller 30 through the vehicle controller 44. Accordingly, the air-conditioning controller 30 is configured to detect whether the power window is in the open state or the close state, based on the open signal or the close signal output from the power window switch 45.

Various controlled devices of the vehicular air-conditioning device are connected to the output side of the air-conditioning controller 30. The controlled devices include the electromagnetic clutch 11a of the compressor 11, the electromagnetic capacity control valve 11b, the servomotor 7 constituting an electric actuating portion, the servomotor 18, the servomotor 25, the motor 8b of the inside blower 8, and the motor 12b of the cooling fan 12a. The actuations of the controlled devices are controlled by the output signal from the air-conditioning controller 30.

Next, a control process executed by the air-conditioning controller 30 of the vehicular air-conditioning device according to the first embodiment will be described with reference to the flowchart of FIG. 2. The control program is executed upon the air-conditioning switch 40 and the auto switch 42 being turned on in a condition where the ignition switch of the vehicle engine E is turned on, and thus the auto control in the cooling mode is performed. Control steps illustrated in the flowchart of FIG. 2 constitutes various function implementation sections included in the air-conditioning controller 30.

Figure 2:
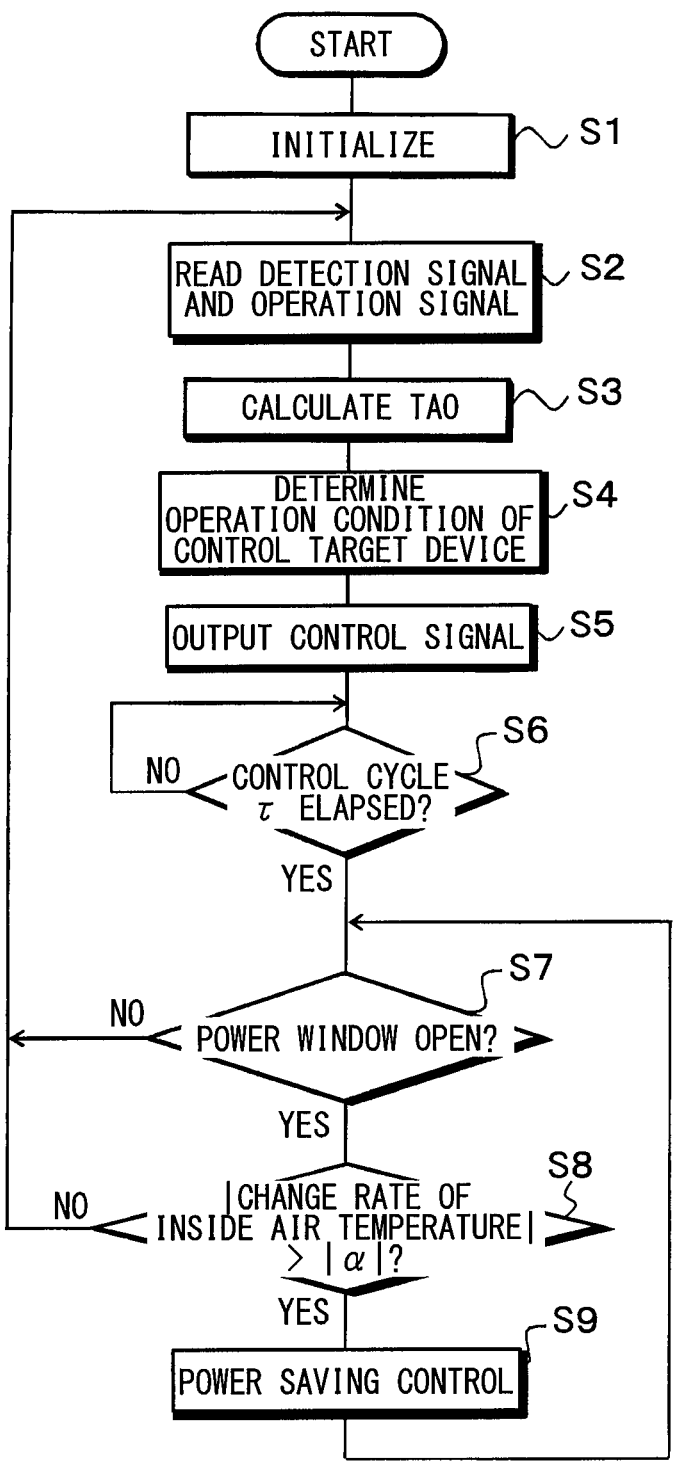
FIG. 2 is a flowchart showing a flow of a process of the air-conditioning control according to the first embodiment.

First, in step S1, an initialization of the vehicular air-conditioning device is performed as shown in FIG. 2. Specifically, in the initialization, flags, timers and the like constituted by a memory circuit of the air-conditioning controller 30 are initialized, and initial alignments of stepper motors constituting the above-described various electric actuators are performed, for example.

In the initialization in step S1, some flag values and calculated values stored at a previous stop timing of the vehicular air-conditioning device and the vehicular system may be read out.

Next, in step S2, the detection signals from the sensor group for the air-conditioning, the operation signals from the operation panel 37, and the signals output from the power window switch 45 are read, for example.

In subsequent step S3, a target blowout temperature TAO that is a target temperature of the air blown into the passenger compartment is calculated based on the detection signals and the operation signals read in step S2.

Specifically, the target blowout temperature TAO is calculated by the following formula F1.

$$TAO = Kset \times Tset - Kr \times Tr - Kam \times Tam - Ks \times As + C \tag{F1}$$

Tset is the set temperature in the passenger compartment set with the temperature setting switch 43, Tr is the passenger compartment temperature (inside air temperature) detected by the inside air sensor 32, Tam is the outside air temperature detected by the outside air sensor 31, and As is the amount of solar irradiance detected by the solar radiation sensor 33. The formula also includes Kset, Kr, Kam, and Ks indicating control gains, and C indicating a correction constant.

Then, in step S4, the operation states of the various control target devices in the cooling mode are determined based on the target blowout temperature TAO calculated from the inside air temperature Tr and the like, for example. Specifically, the refrigerant discharge capacity of the compressor 11 (i.e. the discharge capacity of the compressor 11), the blowing capacity of the inside blower 8 (i.e. the rotational speed of the inside blower 8), the opening degree of the air mix door 17, the operation state of the expansion valve 14, the operation state of the inside-outside air switching case 5, and the operation state of the blowing port mode switching door (i.e. the air outlet mode) are determined, for example.

For example, the air volume blown by the inside blower 8 is determined by referring the target blowout temperature TAO calculated in step S3 and a control map previously stored in the air-conditioning controller 30, and a blower motor voltage applied to the motor 8b is output.

The inside-outside air intake mode of the inside-outside air switching case 5 is also determined by referring the target blowout temperature TAO calculated in step S3 and a control map previously stored in the air-conditioning controller 30. For example, the inside mode is set when the inside air temperature Tr is higher than the set temperature Tset by a predetermined value (i.e. when the cooling load is high). As the target blowout temperature TAO rises from a low temperature side to a high temperature side, the mode is switched to be an all-inside air mode, an inside and outside air mixed mode, and an all-outside air mode, in order.

The blowing port mode of the inside air-conditioning unit 1 is also determined by referring the target blowout temperature TAO calculated in step S3 and a control map previously stored in the air-conditioning controller 30. For example, as the target blowout temperature TAO rises from the low temperature side to the high temperature side, the blowing port mode is switched to be a foot mode, a bilevel (B/L) mode, and a face mode, in order.

A target opening degree SW of the air mix door 17 is calculated by the following formula F2 based on the target blowout temperature TAO, the evaporator blown air temperature Te, and the engine cooling water temperature Tw.

$$SW = \{(TAO - Te)/(Tw - Te)\} \times 100(\%) \tag{F2}$$

When SW=0%, the air mix door 17 is at a maximum cooling position, and the bypass passage 16 is fully opened and the air passage on the heater core 15 side is fully closed. In contrast, when SW=100%, the air mix door 17 is at a maximum heating position, and the bypass passage 16 is fully closed and the air passage on the heater core 15 side is fully opened.

The target cooling temperature TEO of the evaporator 9 is also determined by referring the target blowout temperature TAO calculated in step S3 and a control map previously stored in the air-conditioning controller 30. The cooling target temperature TEO is a target temperature at which the evaporator 9 cools the air blown into the passenger compartment. The cooling target temperature TEO is required for adjusting the temperature and the humidity of the air blown into the passenger compartment.

The discharge capacity of the compressor 11 is calculated as a control current supplied to the electromagnetic capacity control valve 11b. The control current is calculated as a control current for making the evaporator blown air temperature Te closer to the target cooling temperature TEO. In the calculation, a deviation between actual evaporator blown air temperature Te and the cooling target temperature TEO of the evaporator 9, and then the control current is calculated by using a feedback control such as proportional-integral control (PI control) based on the deviation.

After the operation states of the various air-conditioning control devices are determined, in step S5, the control signals, the control voltage and the control current are output from the air-conditioning controller 30 to the various air-conditioning control devices to achieve the operation conditions of the various air-conditioning control devices.

In subsequent step S6, the process is kept on standby for the control period τ and proceeds to step S7 when an elapse of the control period τ is determined.

In step S7, it is determined whether the power window is open based on the open signal and the close signal input from the power window switch 45 through the vehicle controller 44. When it is determined that the power window is open, the process proceeds to step S8. A part of the air-conditioning controller 30 corresponding to step S7 may be an example of an open signal detector that detects the open signal indicating the open of the opening portion or an example of a close signal detector that detects the close signal indicating the close of the opening portion.

In contrast, when it is determined that the power window is closed, the process returns to step S2. In this case, the vehicular air-conditioning device automatically controls the air-conditioning of the passenger compartment based on the inside air temperature Tr, for example, through steps S2 to S6. That is, the controlled states of the various air-conditioning control devices of the vehicular air-conditioning device are changed based on the inside air temperature Tr, for example. A section of the air-conditioning controller 30 corresponding to steps S2 to S6 may be an example of an auto controller that is configured to perform an auto control changing automatically the operation of the inside air conditioner based on the inside air temperature Tr detected by the inside air sensor 32.

In step S8, it is determined whether an absolute value of a change rate of the inside air temperature Tr is larger than an absolute value of a predetermined reference change rate $\alpha$. The reference change rate $\alpha$ is determined based on a maximum air-conditioning performance in the auto control (i.e. steps S2 to S6) of the vehicular air-conditioning device according to the first embodiment. In this case, the reference change rate $\alpha$ corresponds to a maximum cooling capacity of the vehicular air-conditioning device in the auto control.

Specifically, first, the change rate of the inside air temperature Tr is calculated based on the detection signal from the inside sensor 32 read in step S2. The change rate of the inside air temperature Tr is the change amount of the inside air temperature Tr within a predetermined time period (e.g. the control period $\tau$). Next, it is determined whether the absolute value of the change rate of the calculated inside air temperature Tr is larger than the absolute value of the reference change rate $\alpha$. That is, in step S8, it is determined whether a change of a thermal load of the outside air flowing into the passenger compartment due to opening of the power window exceeds the maximum cooling performance of the auto control of the vehicular air-conditioning device. A section of the air-conditioning controller 30 corresponding to step S8 may be an example of a thermal load determiner configured to determine whether the change of the thermal load on the passenger compartment exceeds the air-conditioning performance of the auto control.

When it is determined that the absolute value of the change rate of the inside air temperature Tr is larger than the absolute value of the predetermined reference change rate $\alpha$, a power saving control is performed in step S9. In contrast, when it is determined that the absolute value of the change rate of the inside air temperature Tr is at or below the absolute value of the predetermined reference change rate $\alpha$, the process returns to step S2 to continue the auto control. A section of the air-conditioning controller 30 corresponding to step S9 may be a power saving control portion configured to perform the power saving control.

For example, when the opening degree of the power window is small, the process returns to step S2 based on the determination in step S8. In this case, in steps S2 to S6, the control states of the air-conditioning controllers are changed based on the change of the inside air temperature Tr, for example, to properly perform the air-conditioning of the passenger compartment.

In the power saving control in step S9, first, the operation states of the various air-conditioning control devices in the power saving control are determined by referring the detection result read in step S2 when the open signal of the power window is received, and a power saving control map previously stored in the air-conditioning controller 30.

In the power saving control map, the control states of the various air-conditioning control devices are associated with a difference between the outside air temperature Tam and the inside air temperature Tr, and the change rate of the inside air temperature Tr used in step S8. The control states of the various air-conditioning control devices in the power saving control map are set such that an apparent temperature of occupants in the passenger compartment is not deteriorated in a circumference determined from the change rate of the inside air temperature Tr and the difference between the outside air temperature Tam and the inside air temperature Tr.

As shown in FIG. 3, in step S9 of the first embodiment, the control current for the refrigerant volume discharged from the compressor 11, the voltage for the blower motor of the inside blower 8, and the target opening degree of the air mix door 17 are set to be a parameter X, Y, Z, respectively, by referring to the difference between the outside air temperature Tam and the inside air temperature Tr, the change rate of the inside air temperature Tr, and the power saving control map, for example.

In the power saving control, the control signals are output to the various air-conditioning control devices to keep the control states of the various air-conditioning control devices determined by referring to the power saving control map regardless of the subsequent change of the inside air temperature Tr. The process returns to step S7 after the control signals are output to the various air-conditioning control devices.

Accordingly, the power saving control in step S9 is continuously performed while the power window is open and the absolute value of the change rate of the inside air temperature Tr is larger than the absolute value of the reference change rate $\alpha$. In this case, the operation states determined based on the power saving control map, for example, are maintained without being changed even when the inside air temperature Tr in the passenger compartment changes.

Next, effects of the power saving control of the first embodiment will be described. As described above, the power saving control in step S9 is performed after the process of steps S7, S8.

In the situation where the power window is open and the absolute value of the change rate of the inside air temperature Tr is larger than the absolute value of the reference change rate $\alpha$, the outside air flows into the passenger compartment and the thermal load on the passenger compartment drastically changes due to the inflow of the outside air because the power window is open.

In such a situation, if the air-conditioning in the passenger compartment is automatically controlled, the operation states of the various air-conditioning control devices change to a state where the power consumption is large to mitigate the drastic change of the inside air temperature Tr due to the inflow of the outside air into the passenger compartment.

Assuming such a situation when the passenger compartment is cooled in summer, the air-conditioning controller 30 increases the power consumption of the inside air-conditioning unit 1 and the refrigeration cycle device 10 according to the auto control to cool the passenger compartment more. Specifically, the refrigerant discharge capacity of the compressor 11 of the refrigeration cycle device 10 is increased, and the air volume blown by the inside blower 8 of the inside air-conditioning unit is increased.

However, if the apparent temperature of the occupants in the passenger compartment becomes worse even if the power consumption is increased, the increased power is wasteful for realizing comfortable air-conditioning.

In contrast, the vehicular air-conditioning device of the first embodiment is configured to maintain the predetermined control states according to the power saving control in step S9 based on the power saving control map without changing the operation states of the various air-conditioning control devices in response to the change of the inside air temperature Tr even in such situation.

As shown in FIG. 3, in the power saving control, the discharge capacity of the compressor 11 and the air volume blown by the inside blower 8 determined based on the power saving control map. The power consumption is not increased by increasing the discharge capacity of the compressor 11 or the air volume blown by the inside blower 8 as in the auto control. According to the vehicular air-conditioning device of the first embodiment, the increase of the power consumption that may be wasteful if the auto control is performed in such situation can be limited.

The operation states of the various air-conditioning control devices which are maintained in the power saving control in step S9 are determined by referring the detection result read in step S2 when the open signal of the power window is received, and a power saving control map previously stored in the air-conditioning controller 30.

That is, in the vehicular air-conditioning device according to the first embodiment, even when executing the power saving control, deterioration of the apparent temperature of the occupants in the passenger compartment can be suppressed to some extent.

As described above, the vehicular air-conditioning device according to the first embodiment is mounted on a vehicle having a power window, and performs air conditioning of the passenger compartment. The vehicular air-conditioning device includes the inside air-conditioning unit 1, the refrigeration cycle device 10, and the air-conditioning controller 30. The vehicular air-conditioning device controls the air-conditioning controller 30 to perform the auto control (i.e. steps S2 to S6), and thereby achieves a comfortable air-conditioning in the passenger compartment based on the detection result of the inside air sensor 32, for example.

The vehicular air-conditioning device performs the power saving control in step S9 when the open signal from the power window switch 45 is detected and it is determined that the change of the thermal load on the passenger compartment exceeds the air-conditioning capacity of the auto control. In the power saving control, the various air-conditioning control devices are controlled to maintain the operation states determined based on the power saving control map.

Accordingly, the vehicular air-conditioning device does not increase the power consumption by the inside blower 8 of the inside air-conditioning unit 1 or by the compressor 11 of the refrigeration cycle device 10 as in the auto control even when the thermal load on the passenger compartment drastically changes due to the inflow of the outside air. Accordingly, the waste of the power consumption that does not contribute to improvement of the apparent temperature of the occupants can be suppressed.

According to the vehicular air-conditioning device, the change of the thermal load on the passenger compartment is determined based on the change rate of the inside air temperature Tr detected by the inside air sensor 32. Since a general vehicular air-conditioning device includes an inside air sensor 32, the change of the thermal load on the passenger compartment can be detected to compare with the air-conditioning capacity in auto control without a special device for detection.

In the power saving control in step S9, the operation states of the various air-conditioning control devices are determined by referring to the change rate of the inside air temperature Tr, the power saving control map, and the difference between the outside air temperature Tam detected by the outside air sensor 31 and the inside air temperature Tr, and the operation states are maintained. Accordingly, in the vehicular air-conditioning device, even when executing the power saving control, deterioration of the apparent temperature of the occupants in the passenger compartment can be suppressed to some extent.

When the close signal of the power window is detected in step S7 in the power saving control, the vehicular air-conditioning device performs the auto control (i.e. steps S2 to S6). When the power window is closed, since the outside air does not flow into the passenger compartment through the power window, the change of the thermal load on the passenger compartment may be small. By performing the auto control in such a case, the vehicular air-conditioning device can quickly achieve a comfortable air-conditioning in the passenger compartment.

Second Embodiment

A second embodiment different from the above-described first embodiment will be described with reference to the drawings. The vehicular air-conditioning device according to a second embodiment includes an inside air-conditioning unit 1, a refrigeration cycle device 10, and an air-conditioning controller 30, as in the first embodiment. In the second embodiment, the configurations of the inside air-conditioning unit 1 and the refrigeration cycle device 10 are basically the same as the first embodiment.

The vehicular air-conditioning device of the second embodiment is different from the first embodiment in that the vehicular air-conditioning device includes an infrared sensor 36 as one of the sensors for air-conditioning control. The determination process and the contents of the power saving control of the second embodiment are different from the first embodiment.

The following description accordingly includes the reference signs that are identical to those of the first embodiment and indicate the identical configurations described in the preceding description.

Figure 4:
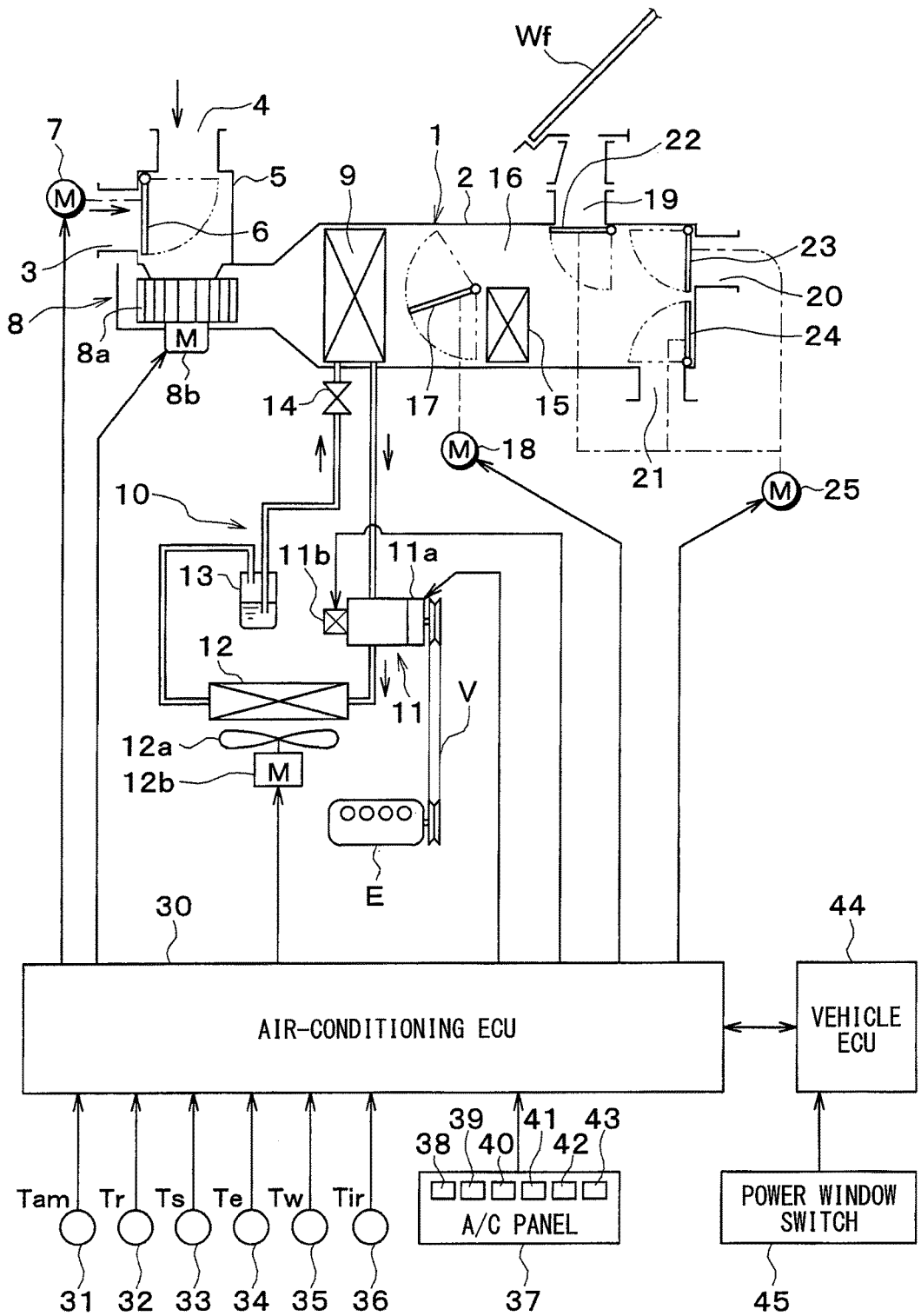
FIG. 4 is a diagram illustrating an overall configuration of a vehicular air-conditioning device according to a second embodiment of the present disclosure.

As show in FIG. 4, the infrared sensor 36 is a matrix IR sensor and is positioned in a center part of a ceiling panel inside the passenger compartment to detect a temperature in the passenger compartment. A detection part of the infrared sensor 36 includes a sensor chip having multiple thermocouples arranged in a matrix on one side, and an infrared absorbing film covering the one side of the sensor chip.

The infrared absorbing film absorbs infrared from a detection target object (i.e. occupants) through a lens of a casing of the infrared sensor and converts the infrared to heat. The thermocouples are temperature detection elements that convert the heat generated by the infrared absorbing film to voltage. Accordingly, the infrared sensor 36 is configured to measure a body surface temperature of an occupant in the passenger compartment as an occupant surface temperature Tir by detecting the infrared radiated in the passenger compartment.

The infrared sensor 36 is connected to the input side of the air-conditioning controller 30 as a member of the air-conditioning sensor group. Accordingly, the air-conditioning controller 30 is configured to detect the occupant surface temperature Tir in the passenger compartment based on the sensor detection signal output from the infrared sensor 36.

Next, a control process executed by the air-conditioning controller 30 of the vehicular air-conditioning device according to the second embodiment will be described with reference to the flowchart of FIG. 5. As in the first embodiment, the control program according to the second embodiment is executed upon the air-conditioning switch 40 and the auto switch 42 being turned on in a condition where the ignition switch of the vehicle engine E is turned on, and thus the automatic control in the cooling mode is performed.

Figure 5:
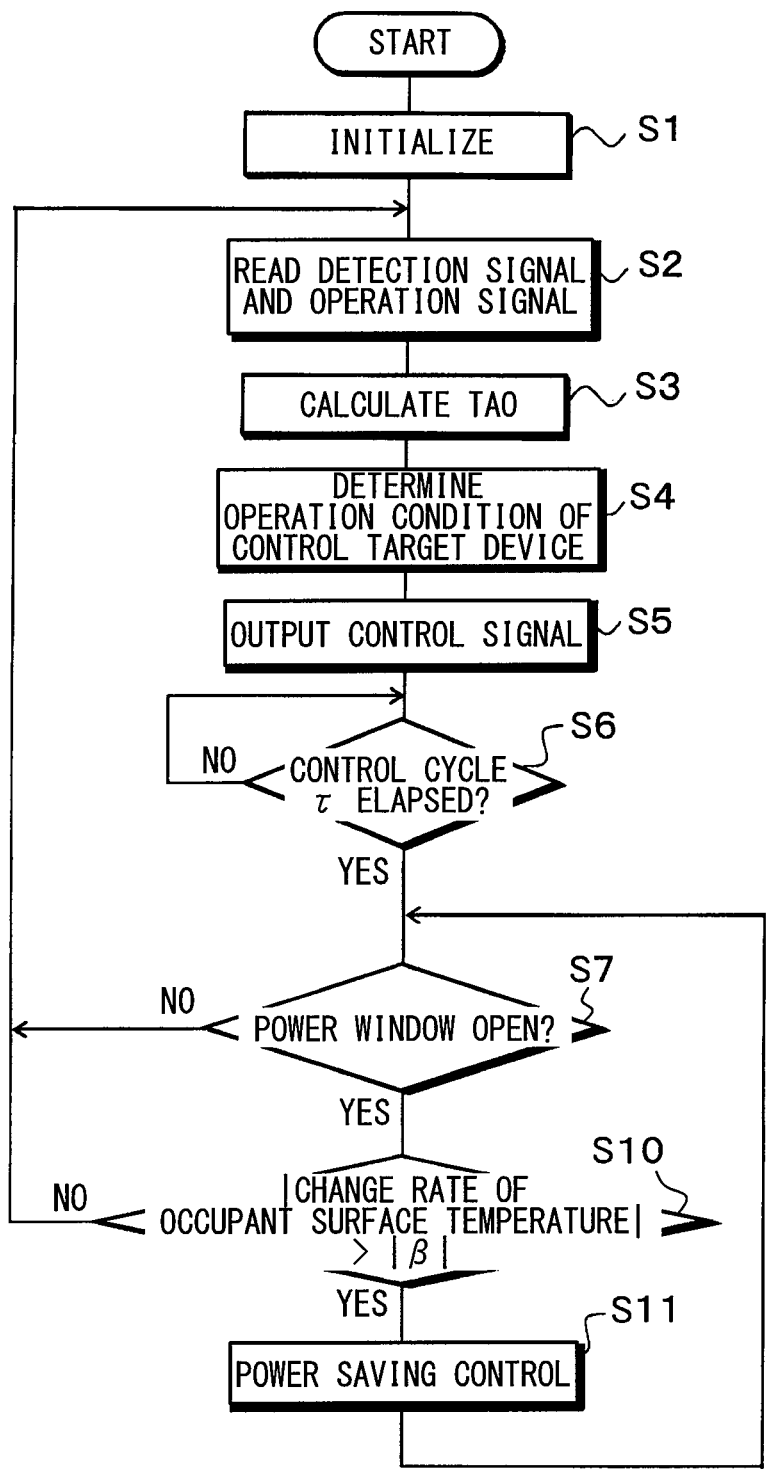
FIG. 5 is a flowchart showing a flow of a process of the air-conditioning control according to the second embodiment.

As shown in FIG. 5, in the second embodiment, steps S1 to S6 similar to the first embodiment are performed by the air-conditioning controller 30. In step S2, the detection signal from the infrared sensor 36 that is a member of the sensor group for the air-conditioning control is read in step S2.

The auto control of the cooling of the second embodiment is performed by steps S2 to S6. According to the vehicular air-conditioning device of the second embodiment, the control state of the air-conditioning device is changed in the auto control of the cooling (i.e. steps S2 to S6) based on the change of the inside air temperature Tr to properly perform the air-conditioning in the passenger compartment.

In the second embodiment, the process proceeds to step S7 after the control period τ elapses, and it is determined whether the power window is open based on the open signal and the close signal input from the power window switch 45 through the vehicle controller 44. When it is determined that the power window is open, the process proceeds to step S10. In contrast, when it is determined that the power window is closed, the process returns to step S2.

Since the process returns to step S2, the vehicular air-conditioning device of the second embodiment performs the air-conditioning in the passenger compartment by the auto control based on the inside air temperature Tr as in the first embodiment. That is, in the second embodiment, the controlled states of the various air-conditioning control devices are changed based on the inside air temperature Tr, for example.

In step S10, it is determined whether an absolute value of a change rate of the occupant surface temperature Tir is larger than an absolute value of a predetermined reference change rate β. In this case, the reference change rate β is determined based on the maximum air-conditioning capacity of the auto control of the vehicular air-conditioning device according to the second embodiment. That is, the reference change rate β of the second embodiment corresponds to the maximum cooling capacity in the auto control of the vehicular air-conditioning device.

In step S10, first, the change rate of the occupant surface temperature Tir is calculated based on the detection signal of the infrared sensor 36 read in step S2 of FIG. 5. The change rate of the occupant surface temperature Tir is the change amount of the occupant surface temperature Tir in a predetermined time period (e.g. the control period τ). Next, it is determined whether the absolute value of the change rate of the calculated occupant surface temperature Tir is larger than the absolute value of the reference change rate β.

That is, in step S10, it is determined whether a change of a thermal load of the outside air flowing into the passenger compartment due to opening of the power window exceeds the maximum cooling performance of the auto control of the vehicular air-conditioning device based on the change of the apparent temperature of the occupant. A section of the air-conditioning controller 30 corresponding to step S10 may be an example of a thermal load determiner configured to determine whether the change of the thermal load in the passenger compartment exceeds the air-conditioning performance of the auto control.

When it is determined that the absolute value of the change rate of the occupant surface temperature Tir is larger than the absolute value of the predetermined reference change rate β, a power saving control is performed in step S11. In contrast, when it is determined that the absolute value of the change rate of the occupant surface temperature is at or below the absolute value of the predetermined reference change rate β, the process returns to step S2 to continue the auto control. In this case, since influence due to inflow of the outside air or the like is small, the air-conditioning in the passenger compartment is performed properly based on the change of the inside air temperature Tr, for example. A section of the air-conditioning controller 30 corresponding to step S11 may be a power saving control portion configured to perform the power saving control.

In the power saving control in step S11 of the second embodiment, the operation states of the various air-conditioning control devices at the time when the open signal of the power window is received is read first, and they are determined as the operation states of the various air-conditioning control devices in the power saving control. The control signals are output to the various air-conditioning control devices to keep the determined control states of the various air-conditioning control devices regardless of the subsequent change of the inside air temperature Tr. In the second embodiment, the process returns to step S7 after the control signals are output to the various air-conditioning control devices.

That is, the power saving control in step S11 is continuously performed while the power window is open and the absolute value of the change rate of the occupant surface temperature Tir is larger than the absolute value of the reference change rate β. In the second embodiment, the operation states of the various air-conditioning control devices are not changed even when the inside air temperature Tr in the passenger compartment changes, and the operation states of the various air-conditioning control devices determined at the time when the power window is opened are maintained.

Next, effects of the power saving control of the second embodiment will be described. The power saving control of the second embodiment is performed, as in the first embodiment, when the outside air flows into the passenger compartment due to the open of the power window and the thermal load on the passenger compartment drastically change due to the outside air.

In such a situation, based on the power saving control of step S11, the vehicular air-conditioning device of the second embodiment is configured to maintain the control states determined at the time when the power window is opened without changing the operation states of the various air-conditioning control devices based on the change of the inside air temperature Tr.

That is, as shown in FIG. 6, the discharge capacity of the compressor 11 and the air volume blown by the inside blower 8 determined at the time when the power window is opened are maintained, and the power consumption is not increased by increasing the discharge capacity of the compressor 11 and the air volume blown by the inside blower 8 as in the auto control. In the vehicular air-conditioning device of the second embodiment, the power consumption that may be wasteful if the auto control is performed in such situation can be limited.

The operation states of the various air-conditioning control devices maintained in the power saving control of step S11 is the operation states of the various air-conditioning control devices determined at the time when the open signal of the power window is received. That is, the increase of the power consumption can be limited through a control reading out a record of the operation states of the various air-conditioning control devices.

As described above, as in the first embodiment, the vehicular air-conditioning device of the second embodiment controls the air-conditioning controller 30 to perform the auto control (i.e. steps S2 to S6), and thereby achieves a comfortable air-conditioning in the passenger compartment based on the detection result of the inside air sensor 32, for example.

The vehicular air-conditioning device of the second embodiment performs the power saving control in step S11 when the open signal from the power window switch 45 is detected and it is determined that the change of the thermal load on the passenger compartment exceeds the air-conditioning capacity of the auto control.

Accordingly, the vehicular air-conditioning device of the second embodiment does not increase the power consumption by the inside blower 8 of the inside air-conditioning unit 1 or by the compressor 11 of the refrigeration cycle device 10 as in the auto control even when the thermal load on the passenger compartment drastically changes due to the inflow of the outside air. Accordingly, the waste of the power consumption that does not contribute to improvement of the apparent temperature of the occupants can be limited.

In the second embodiment, the change rate of the thermal load on the passenger compartment is determined by using the change rate of the occupant surface temperature Tir detected by the infrared sensor 36. Since the occupant in the passenger compartment feels comfortable or not about the air-conditioning of the passenger compartment, the change of the thermal load due to the inflow of the outside air can be adequately determined by using the occupant surface temperature Tir.

The operation states of the various air-conditioning control devices in the power saving control of step S11 are the operation states of the various air-conditioning control devices determined at the time when the power window is opened. Accordingly, in the second embodiment, the increase of the power consumption can be limited through a control reading out a record of the operation states of the various air-conditioning control devices.

In the second embodiment, when the close signal of the power window is detected in step S7 in the power saving control, the vehicular air-conditioning device performs the auto control (i.e. steps S2 to S6). That is, the vehicular air-conditioning device can quickly achieve the comfortable air-conditioning of the passenger compartment by performing the auto control when the change of the thermal load on the passenger compartment is small.

The embodiments of the present disclosure have been described above, although the present disclosure should not be limited to any one of the embodiments. The present disclosure can be modified variously within a range not departing from the gist of the present disclosure. For example, any of the above embodiments may be combined where appropriate. The above embodiments can alternatively be modified variously as follows.

In the above-described embodiments, switching between the auto control and the power saving control in cooling is described. However, the embodiments can be used for switching between the auto control and the power saving control in heating. When the present disclosure is used in heating, for example, the power consumption of the vehicular air-conditioning device can be limited in a situation where the power window is opened when heating of the passenger compartment is performed in winter. A four-way valve may be added to the refrigeration cycle device 10 of the above-described embodiments to perform cooling and heating, for example. Since the absolute value of the change rate is used for determination in step S8 of the first embodiment and step S10 of the second embodiment, the determination is adequate in each cooling and heating.

In the above-described embodiments, the auto control and the power saving control in cooling are switched based on the change of the thermal load due to the opening and closing of the power window. However, the present disclosure is not limited to these specific examples. Any opening portion may be acceptable as long as an inside and an outside communicate with each other through the opening portion and the opening portion is configured to open and close. Accordingly, opening and closing of a sunroof provided on the ceiling of the passenger compartment or opening and closing of a door of the passenger compartment may be the opening and the closing of the opening portion.

In the above-described embodiment, the change of the thermal load on the passenger compartment is determined based on the inside air temperature Tr detected by the inside air sensor 32 or the occupant surface temperature Tir detected by the infrared sensor 36. However, the present disclosure is not limited to these specific examples. The change may be determined based on another detection result by a member of the air-conditioning sensor group such as the evaporator blown air temperature Te. The change may be determined based on multiple detection results such as a combination of the outside air temperature Tam and the inside air temperature Tr.

In the power saving control of the present disclosure, the refrigerant volume discharged by the compressor 11 that is a variable capacity type compressor is changed as the refrigerant discharge capacity. However, the present disclosure is not limited to this specific example. The rotational speed of the compressor 11 may be changed, or a control temperature of a fixed capacity compressor may be changed.

In the power saving control of the above-described embodiments, the operation state of the air-conditioning control device is maintained in a predetermined state. However, various alternatives can be used as long as the power consumption of the vehicular air-conditioning device can be reduced. For example, in the power saving control, the target blowout temperature TAO may be corrected according to a situation, and the corrected target blowout temperature TAO can be used in the auto control. In this case, the target blowout temperature TAO in cooling is corrected to be higher than the normal target blowout temperature TAO, and the target blowout temperature TAO in heating is corrected to be lower than the normal target blowout temperature TAO.

The present disclosure may be used for a manual air-conditioner. In this case, when opening of the power window and an inside air circulation mode are detected, the thermal load on the passenger compartment is determined based on the change rate of the evaporator blown air temperature Te detected by the evaporator temperature sensor 34. And then a threshold of the evaporator blown air temperature Te is increased as the power saving control, and accordingly the power consumption of the vehicular air-conditioning device can be reduced.

The refrigeration cycle device 10 according to each of the above embodiments includes a fluorocarbon refrigerant. The present disclosure is, however, not limited to this case in terms of a type of refrigerant. Applicable examples of the refrigerant according to the present disclosure include a natural refrigerant such as carbon dioxide, as well as a hydrocarbon refrigerant.

The refrigeration cycle device 10 according to each of the above embodiments configures the subcritical refrigeration cycle having high refrigerant pressure not exceeding the critical pressure of the refrigerant. The refrigeration cycle device 10 may alternatively configure a supercritical refrigeration cycle having high refrigerant pressure exceeding the critical pressure of the refrigerant.

Although the present disclosure has been described in accordance with the examples, it is understood that the present disclosure is not limited to the above examples or structures. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicular air-conditioning device for a vehicle having an opening portion through which an inside and an outside of a passenger compartment communicate with each other, the opening portion being configured to open and close, the vehicular air-conditioning device comprising:
    an inside air temperature detector configured to detect an inside air temperature of the passenger compartment;
    an inside air-conditioning portion including
        a refrigeration cycle device in which refrigerant circulates, the refrigeration cycle device being configured to adjust a temperature of air in the passenger compartment, and
        a blower configured to send the air to the passenger compartment; and
    an air-conditioning controller, wherein
    the air-conditioning controller includes
        an auto control portion configured to perform an auto control to automatically change an operation of the inside air-conditioning portion based on the inside air temperature detected by the inside air temperature detector,
        an open signal detector configured to detect an open signal indicating that the opening portion is open,
        a thermal load determiner configured to determine whether a change of a thermal load on the passenger compartment exceeds an air-conditioning capacity of the auto control, and
        a power saving control portion configured to perform a power saving control to limit an increase of a power consumption of at least one of the refrigeration cycle device or the blower of the inside air-conditioning portion regardless of the inside air temperature when the open signal is detected and it is determined that the change of the thermal load on the passenger compartment exceeds the air-conditioning capacity of the auto control, wherein
    the power saving control portion is configured to maintain the power consumption of the refrigeration cycle device of the inside air-conditioning portion regardless of the inside air temperature in the power saving control.

2. The vehicular air-conditioning device according to claim 1, wherein
    the power saving control portion is configured to maintain an air volume blown by the blower of the inside air-conditioning portion regardless of the inside air temperature in the power saving control.

3. The vehicular air-conditioning device according to claim 1, wherein
    the thermal load determiner is configured to determine that the change of the thermal load on the passenger compartment exceeds the air-conditioning capacity of the auto control when a change rate per unit time of the inside air temperature detected by the inside air temperature detector is larger than a predetermined reference change rate.

4. The vehicular air-conditioning device according to claim 1, further comprising:
    an infrared sensor configured to detect a surface temperature of an occupant in the passenger compartment, wherein
    the thermal load determiner is configured to determine that the change of the thermal load on the passenger compartment exceeds the air-conditioning capacity of the auto control when a change amount of the surface temperature of the occupant detected by the infrared sensor is larger than a predetermined reference change amount.

5. The vehicular air-conditioning device according to claim 1, further comprising:
    an outside air temperature detector configured to detect an outside air temperature outside the vehicle, wherein
    the power saving control portion is configured to
        determine an operation state of the inside air-conditioning portion based on a change rate per unit time of the inside air temperature and a difference between the inside air temperature detected by the inside air temperature detector and the outside air temperature detected by the outside air temperature detector, and
        maintain the determined operation state of at least one of the refrigeration cycle device or the blower of the inside air-conditioning portion regardless of the inside air temperature in the power saving control.

6. The vehicular air-conditioning device according to claim 1, wherein
    the power saving control portion is configured to
        determine an operation state of the inside air-conditioning portion upon the open signal being detected by the open signal detector, and
        maintain the determined operation state of at least one of the refrigeration cycle device or the blower of the inside air-conditioning portion regardless of the inside air temperature in the power saving control.

7. The vehicular air-conditioning device according to claim 1, further comprising:
    a close signal detector configured to detect a close signal indicating that the opening portion is closed, wherein
    the auto control portion is configured to perform the auto control of the inside air-conditioning portion when the close signal is detected by the close signal detector in the power saving control.

8. A vehicular air-conditioning device for a vehicle having an opening portion through which an inside and an outside of a passenger compartment communicate with each other, the opening portion being configured to open and close, the vehicular air-conditioning device comprising:
- an inside air temperature sensor configured to detect an inside air temperature of the passenger compartment;
- a refrigeration cycle device configured to adjust a temperature of air in the passenger compartment;
- a blower configured to send the air to the passenger compartment; and
- an air-conditioning processor coupled with the inside air temperature sensor, the refrigeration cycle device, and the blower, wherein the air-conditioning processor is programmed to
- perform an auto control to automatically change operations of the refrigeration cycle device and the blower based on the inside air temperature detected by the inside air temperature sensor,
- detect an open signal indicating that the opening portion is open,
- determine whether a change of a thermal load on the passenger compartment exceeds an air-conditioning capacity of the auto control,
- perform a power saving control to limit an increase of a power consumption of at least one of the refrigeration cycle device or the blower regardless of the inside air temperature when the open signal is detected and it is determined that the change of the thermal load on the passenger compartment exceeds the air-conditioning capacity of the auto control, and
- maintain the power consumption of the refrigeration cycle regardless of the inside air temperature in the power saving control.

9. The vehicular air-conditioning device according to claim 1, wherein the power saving control portion is configured to maintain a power consumption of a compressor included in the refrigeration cycle device regardless of the inside air temperature in the power saving control.

* * * * *